US009958105B1

United States Patent
Dye et al.

(10) Patent No.: US 9,958,105 B1
(45) Date of Patent: May 1, 2018

(54) LOW THERMALLY CONDUCTIVE SPACER FOR HOT AND COLD FEEDLINE INSULATION

(71) Applicant: Quest Thermal Group LLC, Arvada, CO (US)

(72) Inventors: Scott Anthony Dye, Morrison, CO (US); Phillip Nolan Tyler, Westminster, CO (US)

(73) Assignee: Quest Thermal Group LLC, Arvada, CO (US)

( * ) Notice: Subject to any disclaimer, the term of this patent is extended or adjusted under 35 U.S.C. 154(b) by 172 days.

(21) Appl. No.: 14/743,278

(22) Filed: Jun. 18, 2015

Related U.S. Application Data

(60) Provisional application No. 62/014,616, filed on Jun. 19, 2014.

(51) Int. Cl.
*F16L 59/00* (2006.01)
*F16L 59/14* (2006.01)
*B65D 81/38* (2006.01)

(52) U.S. Cl.
CPC .......... *F16L 59/14* (2013.01); *B65D 81/3823* (2013.01)

(58) Field of Classification Search
CPC ...... F16L 59/14; B65D 81/3823; B65D 81/38
USPC .............. 220/592.2, 560.12, 560.13; 428/76; 244/171.7; 52/406.3
See application file for complete search history.

(56) References Cited

U.S. PATENT DOCUMENTS

| 2,930,407 | A | * | 3/1960 | Conley | F16L 59/14 138/114 |
| 5,175,975 | A | * | 1/1993 | Benson | A47J 27/002 428/172 |
| 5,318,108 | A | * | 6/1994 | Benson | A47J 27/002 165/287 |
| 7,954,301 | B2 | | 6/2011 | Mills | |
| 8,234,835 | B2 | * | 8/2012 | Dye | F16L 59/065 244/171.7 |
| 2008/0262621 | A1 | * | 10/2008 | Gorek | A61F 2/4465 623/17.16 |

FOREIGN PATENT DOCUMENTS

WO WO2004020895 * 3/2004 .......... B21C 37/151

* cited by examiner

*Primary Examiner* — J. Gregory Pickett
*Assistant Examiner* — Elizabeth Volz
(74) *Attorney, Agent, or Firm* — Polsinelli PC

(57) ABSTRACT

A multilayer insulation is provided that includes radiant barrier layers separated by one or more spacers. The spacers are configured to maintain separation and provide a low conductivity thermal path between adjacent radiant barrier layers of the multilayer insulation. In certain implementations, the spacers have a shape defined by the intersection of three orthogonally oriented discs and are disposed between two radiant barrier layers of the multilayer insulation. In other implementations, the spacers are mechanically coupled to and extend from a radiant barrier layer.

19 Claims, 9 Drawing Sheets

LOW THERMALLY CONDUCTIVE SPACER FOR HOT AND COLD FEEDLINE INSULATION

CROSS REFERENCE TO RELATED APPLICATIONS

This application claims the benefit of U.S. Provisional Patent Application Ser. No. 62/014,616, filed Jun. 19, 2014, the entire disclosure of which is hereby incorporated herein by reference.

STATEMENT REGARDING FEDERALLY SPONSORED RESEARCH OR DEVELOPMENT

The U.S. Government has a paid up license in this invention and the right in limited circumstances to require the patent owner to license others on reasonable terms as provided for by the terms of contract numbers NNX10RA57P and NNX11CA81C awarded by the National Aeronautics and Space Administration.

FIELD

The present invention relates generally to thermal multi-layer insulation (MLI). More specifically to thermal insulation for highly curved surfaces such as feedlines or piping.

BACKGROUND

Cryogenic storage and transfer is widely used in commercial, medical and aerospace applications. Cryogenic systems require storage reservoirs or tanks, and also require some type of delivery system in the form of feedlines, pipelines or piping system to deliver the cryogen to the functional use. Cryogenic fluids are extremely cold and have low boiling point temperatures; therefore it is difficult to store them without significant fluid loss due to boiloff. One way to reduce the cryogen boiloff is to provide better performing thermal insulation. With ever increasing uses and costs for cryogenic fluids, is the necessity for higher performing thermal insulation systems. Thermal heat leaks are attributed to three modes; conductive, radiative and convective. One method of reducing thermal losses is to operate in an evacuated space, thus eliminating all convective losses, which offers significant reduction in system thermal losses. Reducing additional system losses requires reduction in both radiative and conductive losses.

NASA and commercial launch vehicles typically use cryogenic propellants such as liquid Hydrogen ($LH_2$) at 20K (−423 F), and liquid Oxygen (LOX) at 90K (−298 F), which require thermal insulation for storage and preservation. Heat leak into cryogenic systems limits launch vehicle payloads, and limits spacecraft capabilities and mission durations. Improvements in cryogen storage and transfer are critical to future NASA and commercial space vehicles and extended duration missions. Insulation on cryogenic feed lines is especially problematic, with traditional insulation on piping offering poor thermal performance. MLI wrapped on cryogenic feedlines performs substantially worse than MLI on larger tanks. As much as 80% of total system heat into a spacecraft cryogenic RCS propulsion system is due to transfer line heat leak. Ground support equipment at the launch pad that transfers cryogenic propellants is also problematic, and large amounts of liquid Hydrogen are lost during ground hold and prelaunch activities. As much as 50% of liquid Hydrogen used for each shuttle launch or about 150,000 gallons was lost during transfer chill down and ground hold. Future cryogenic launch vehicles and GSE equipment can benefit from higher performing piping insulation.

A number of aerospace applications also use cryo-coolers for active system cooling as an aid to further reduce propellant boiloff, ideally achieving zero boiloff for extended missions. These cryo-coolers generally circulate liquid Helium (LHe) at 4K (−452 F), or liquid Neon (LNe) at 27K (−411 F) to intercept environmental heat and circulate it away from the tank. These systems require very good insulation on the plumbing to maintain an acceptable efficiency.

Many industrial and medical applications use hot or cold transfer lines. Food and beverage processing facilities use liquid nitrogen ($LN_2$) at 77K (−321 F) or liquid carbon dioxide ($LCO_2$) at 217K (−69 F) for package pressurizing, inerting and flash freezing for increased product shelf life. Medical facilities and pharmaceutical plants use $LN_2$ or LHe in systems and procedures such as MRI, cryobiology, cryosurgery and blood banking, and for manufacture processing requiring long runs from storage reservoir to multiple use points. Liquid natural gas (LNG) is generally used as a means for transporting natural gas to markets where it is regasified and distributed to consumers as pipeline natural gas. The gas is condensed down to liquid form at low pressure by cooling to approximately 111K (−260 F). This liquid form takes up $1/600^{th}$ of the volume of natural gas in the gaseous state which makes it attractive from a transport and delivery aspect. Long pipe runs sometimes of many miles are required to deliver the LNG to storage and transport equipment and poor insulation can have a dramatic effect on process efficiency. In many cases, $LN_2$ is used for flow control and purge of LNG systems and therefore improved insulation would be very beneficial. Industrial uses of cryogens are many including Nuclear Magnetic Resonance Spectroscopy (NMR), forward looking Infrared (FLIR) imaging, and superconducting power distribution. High temperature industrial process pipelines also require thermal insulation for efficient operation. Steam and geothermal power plants are industrial applications in which the operating fluid is at high temperatures. Long pipe runs up to many miles are used and thermal management is a critical aspect to process efficiency.

Aerospace, medical and industrial applications can benefit from higher performing insulations especially where there is a large temperature differential from the system to the ambient environment.

Generally in all thermal transfer applications, system thermal performance is an important factor as it equates to cost, mass, thickness, reliability, predictability, durability, efficiency and capabilities. The general types of insulations used in these systems are foams, fiberous blankets, bulk fill, silicas, or multilayer insulation.

Foam and fiberous materials offer reasonable insulation characteristics, though are of relatively high thermal conductivity on the order of 7-20 mW/m-K in high vacuum. When the differential temperature is large, they must be undesirably thick to keep losses to a minimum. At a density of approximately 38 kg/m³ (e.g., foam) the mass becomes high. A bulk fill material such as Perlite (siliceous rock) offers another solution and has a thermal conductivity on the order of 40-100 mW/m-K, though they are very dense at 50-240 kg/m³. Silica materials are also used as insulation materials though have limited application mainly for higher temperature capabilities. Silica has a thermal conductivity of approximately 1.4 W/m-K, and the density is high at 240 kg/m$^3$. Silicas are capable of withstanding temperatures of 1700K (2600 F). Silica aerogels have low thermal conductivities, on the order of 1 to 19 mW/m-K, but are also quite dense at 50 kg/m$^3$.

Multi-layer insulation (MLI) is generally the preferred insulation for in-space or in vacuum application due to the increased performance in vacuum over alternative insulation materials. In a high vacuum environment such as space (<10$^{-2}$ Pa), or vacuum jacketed pipe, MLI generally offers performance 10 times better than competitive insulation such as foam or silica type blankets or bulk fill. Traditional MLI is a series of alternating layers of low emissivity radiant barriers of metallic or metalized polymer film and thin polyester or silk netting. The netting is used to separate the radiant barriers and prevent interlayer contact. Netting based MLI has a thermal conductivity of approximately 0.25 mW/m-K and a density of 23 kg/m$^3$. This is approximately 28 times better performance than foam insulation. However, traditional MLI insulation for cryogenic propellant feed lines is problematic, and performs typically about ten times worse per area than MLI insulation on a tank. This is representative of capabilities of current state of the art insulation technology for cryogenic piping.

The poor performance of MLI wrapped on feed lines is due to compression of the MLI layers when wrapped on a curved surface, with increased interlayer contact and heat conduction. The compression is dependent on wrap tension and compression due to loading from additional layers. Conventional MLI on large cryotanks has a typical "degradation factor" (from the heat leak predicted by the semi-empirical "Lockheed equation" developed for multilayer insulation) of 1.6; the measured degradation factors for MLI spiral wrapped on pipes can be as high as 20. The MLI performance is not only much worse than expected, but also is difficult to predict due to the uncertainty of increased interface conductance driven by wrap tension and installation workmanship.

Embodiments of the present invention solve a number of the shortcomings of the prior state of the art methods for insulating hot and cold feed lines used in aerospace and commercial applications. Significant reductions in heat leak and fluid boiloff can be realized. Embodiments of the present invention also allow for much greater confidence in predictability and repeatability, and are less dependent on effects of compression due to gravity or installation workmanship. Measured thermal characteristics of the present invention demonstrated a thermal conductivity as low as 0.06 mW/m-K with a density of 32 kg/m$^3$. This is over four times better performance than current state of the art MLI, 16 times better than bulk fill, and 116 times better than foam insulations.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to additional improvements.

Embodiments of the present invention are a structural spacer capable of supporting a plurality of radiation shields about a curved surface such as a pipe or tank. The radiation barriers also referred herein to as thermal barriers or sheets, are of low surface emissivity such as metalized polymer films, or metallic materials. The structural spacer is defined to support the thermal barriers and minimize the thermal conduction between adjacent sheets by means of reducing the cross sectional area to length ratio (A/L) across the spacer correlating to the conductive path. Material selection also plays a key role in minimizing system heat flow and needs to be of low thermal conductivity. Furthermore, the geometry of the spacer is defined as to minimize the surface contact of the spacer to the adjacent radiant barriers when wrapped about a curved surface thus further reducing the conductive losses between adjacent barriers and reducing the interface conductance between barrier layer and spacer. The spacers are situated upon a radiant barrier in a fashion that fully supports an adjacent radiant barrier as well as any additional radiant barrier spacer layers to avoid inter layer touching and thermal shorting of adjacent radiant barriers The preferred embodiment of the spacer is a spherical shape produced by the intersecting of three orthogonal discs. This produces a spacer of defined symmetrical height, yet minimizes the cross sectional area spanning the height. The thickness of the discs is predominately governed by limitations in current state of the art manufacturing capabilities and currently is on the order of 0.25 mm (0.01"). The surface of the spacer in contact with the radiant barriers is reduced to a very small curved surface, a line, or point contact which further reduces conductive losses through the system. The spacer is manufactured of a material conducive to minimizing thermal conduction through it, therefore is produced from low thermally conductive materials such as Ultem, PEEK, LCP polymers or similar. The spacer can take on many different shapes and configurations as described in the figures to perform the required task of minimizing thermal conduction while providing structural support, and the illustrations and embodiments presented should not be construed as limiting in scope.

The spacers are attached to thermal barrier materials by some means such as bonding, welding, or mechanically fastening in a predetermined arrangement to meet application requirements such as pipe diameter, wrap technique, wrap pitch, layer support, and thermal performance, or any combination thereof. The spacer can be allowed to sit at random orientations such as on a pocket or deliberately oriented onto the surface if necessary. A lattice or mesh could be used to aid in orientation of the spacer as to further reduce thermal conduction, or to facilitate better predictability.

An alternative preferred embodiment of the spacer is to construct the spacer from a flowable mixture of appropriate low thermally conductive materials such as UV curable adhesive and silica microspheres. Based on the mix ratio, the bulk thermal conductivity of the flowable material can be significantly lower than a homogenous polymer. Polymers generally have a thermal conductivity of approximately 0.2 W/m-K @ 21C, where introduction of a 60% fill of silica glass microbeads can reduce the thermal conductivity to 0.01 W/m-K. This mixture can then be dispensed onto the radiant barrier surface in a preferred arrangement as described above, and in a predefined geometry conducive to minimizing thermal conduction through the part. The material is then cured in place by some external agent such as UV light or heat. The geometry is maintained by use of a forming fixture suitable to produce the predefined shape of the spacer, allow for UV light or heat transmission for curing, and be of suitable material to aid in release of the form from the cured spacer. Additionally, the flowable mixture could be allowed to wick through a hole in the radiant barrier producing an opposing bulbous shape which acts as a mechanical fastening of the cured spacer.

The resulting spacer/radiant barrier layers are wrapped about a curved surface such as a pipe or tank. In all cases for all layers, there are sufficient spacers in predefined locations suitable to support and separate adjacent spacer/radiant barrier layers. One preferred method of wrapping would be in a helical fashion as defined by spacer placement and a wrap pitch such that the material traverses along the length of structure as it is applied leaving a slight material overlap between adjacent wraps. An alternative wrapping method would be dictated by spacer placement and wrapping in a clamshell fashion such that the material wraps circumferentially about a length of structure with a slight overlap of material. In either case the exterior diameter of the layered structure is increasing and therefore the wrap diameter is also increasing by twice the height of the support spacers.

Methods of using the embodiments of the present invention are also included for wrapping of more complex geometry such as corner, tees, flanges, manifolds or the like. Panels of appropriate shape and spacer locations can be defined that would wrap and/or fold around the complex geometry having sufficient spacers to support adjacent panels. The panels then grow accordingly to meet requirements of the enlarging exterior area. For each subsequent panel, a sufficient number and locations of spacers are applied to fully support and separate the adjacent layer and any additional layers.

An alternative embodiment of the spacer could combine the radiant barrier feature within the confines of spacer geometry. The spacer geometry and functionality of the present invention could be located in plurality and structurally one in the same with a thin material structure and conform to a specific geometrical shape. A plurality of these said structures could then be geometrically defined to nest within other adjacent structures to present a multilayered low thermally conductive system. Only the geometry of the spacer makes contact to the adjacent layer thus minimizing thermal conduction through the thermal barriers. This entire structure could be of low emissivity through a secondary operation such as vapor deposition of metal or metal leafing. Additional features and advantages of the present invention will become more apparent from the following description and included figures.

DETAILED DESCRIPTION

Figure 1:
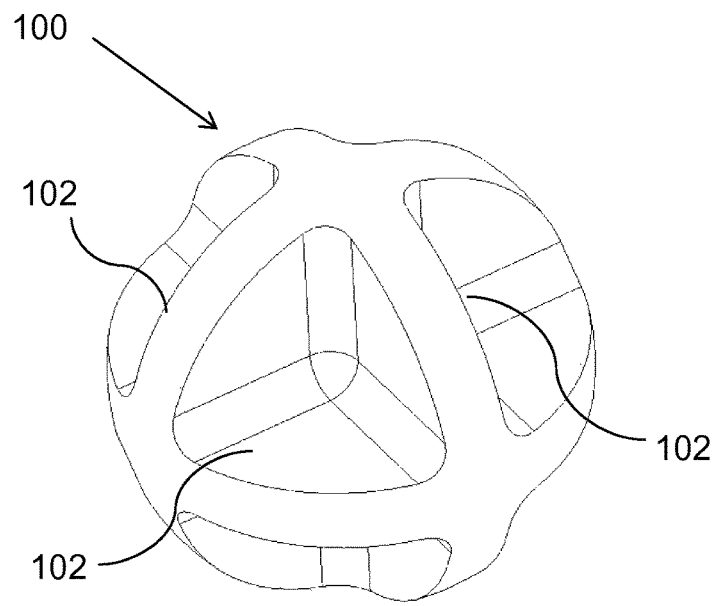
FIG. 1. Illustrates a Triple Orthogonal Disc (TOD) spacer in accordance with the embodiments of the present invention.

The present invention is directed to a structural spacer as an integral part of a multilayer insulation system for hot and cold feedlines. A preferred embodiment of the structural spacer is depicted in FIG. 1 as structure 100 and is intended to minimize the thermal conduction through the structure. One method of reducing thermal conduction is to use low thermally conductive materials such as Ultem, PEEK, LCP, or similar, while another means is by reducing the effective area to length (A/L) ratio of the conductive path and contact area. As depicted in FIG. 1, the spacer 100 can be comprised of intersection of three orthogonal discs 102, thereby minimizing the thermal conductive path. A spherical shape also presents a limited contact area of the outermost surface of the spacer.

Figure 2:
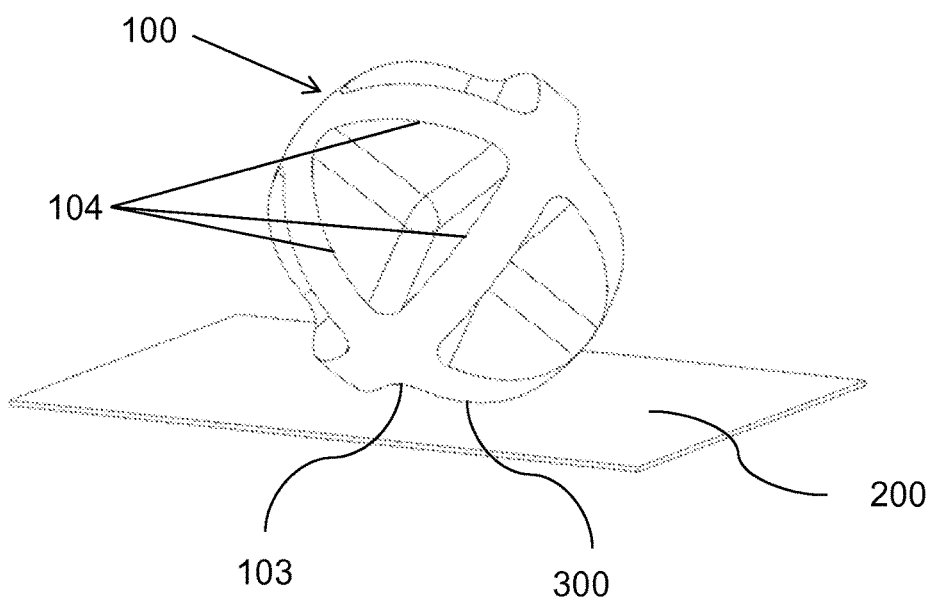
FIG. 2. Illustrates a TOD spacer located on a pocket between discs as is generally the case in application.

The spacer 100 is attached to a radiant barrier 200 of low emissivity materials such as metalized polymer or metal sheets by some means such as adhesive bonding 300 in the case shown in FIG. 2. Through description in following figures it will become apparent that other attachment methods are plausible. The spacer 100 can rest on the radiant barrier 200 situated on a pocket 103 defined by the three adjoining edges 104. If the spacer 100 is bonded to the radiant barrier 200, the adhesive fills the pocket 103 which might have a slight detrimental effect on thermal conduction. This is generally how the spacer 100 would naturally sit on the radiant barrier 200. This allows the spacer to be positioned on the radiant barrier without regard to orientation.

Figure 3:
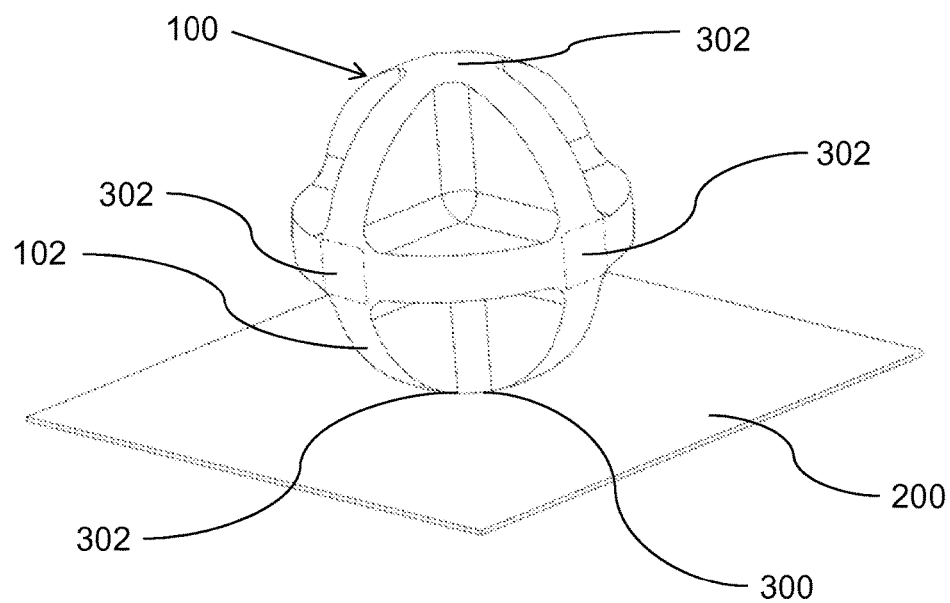
FIG. 3. Illustrates a TOD spacer located on a disc edge as is sometimes the case in application.

There may be instances where it is preferable to orient the spacer as shown in FIG. 3. The spacer 100 may be bonded using a suitable adhesive 300 to the radiant barrier surface 200 resting on an intersection 302 of two orthogonal discs 102. This would minimize the A/L ratio for the structure 100 and provide the optimal solution. The intersection area of two discs 302 also presents a minimal surface contact area for adjacent radiant barriers thus further reducing thermal conduction. This requires orienting the spacer in a preferred manner and adds complexity to the handling and application of the spacer to the radiant barrier surface that may not be required in all cases.

Figure 4:
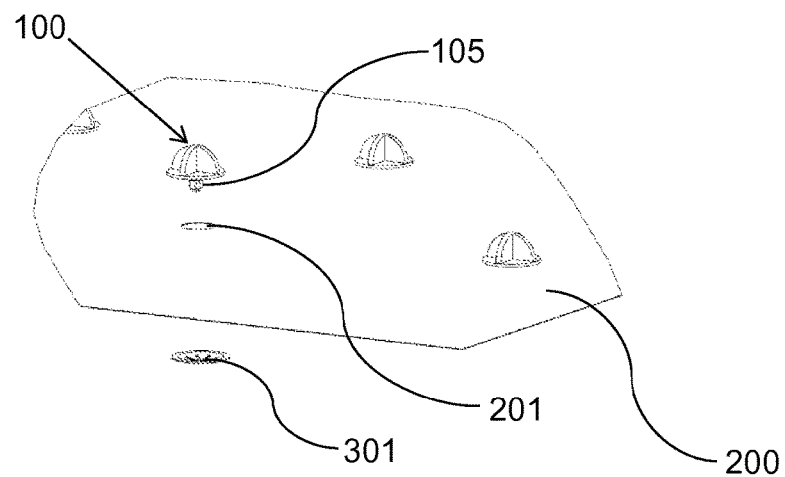
FIG. 4. Illustrates a spacer that is mechanically fastened to the barrier surface.
Figure 5:
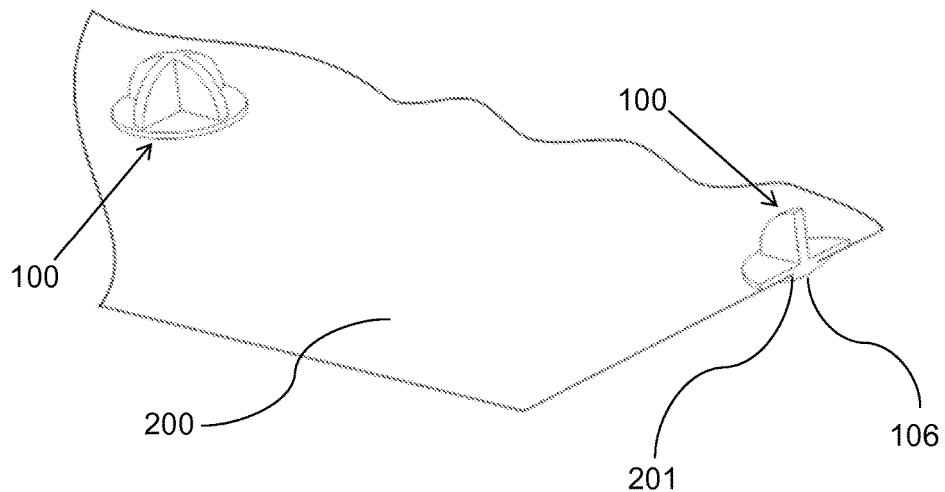
FIG. 5. Illustrates a spacer that is heat staked to the barrier surface

A spacer as illustrated in FIG. 4 and FIG. 5 should be taken as exemplary in shape and not limiting. The spacer 100 consists of thin walls sufficient to provide required structural integrity of the system to support multiple layers as described below and minimize the thermal conduction through the spacers 100. The spacer 100 may be mechanically attached to the radiant barrier surface 200. A bulbous or pronged feature 105 could either pass through a hole 201 in the radiant barrier 200, or could be suitable for piercing the hole 201 through the radiant barrier 200 while being positioned. The bulbous feature 105 would then be held captive by some mechanical fastener 301 thus securing the spacer 100 to radiant barrier 200. An alternative attachment method could be through heat staking or ultrasonically welding the spacer 100 to the radiant barrier surface 200 as depicted in FIG. 5. Heat or heat energy can be administered to the bulbous feature 105 (FIG. 4) and melt into a captive rivet 106 securing the spacer 100 to radiant barrier 200 without the need for an additional fastener 301.

Figure 6:
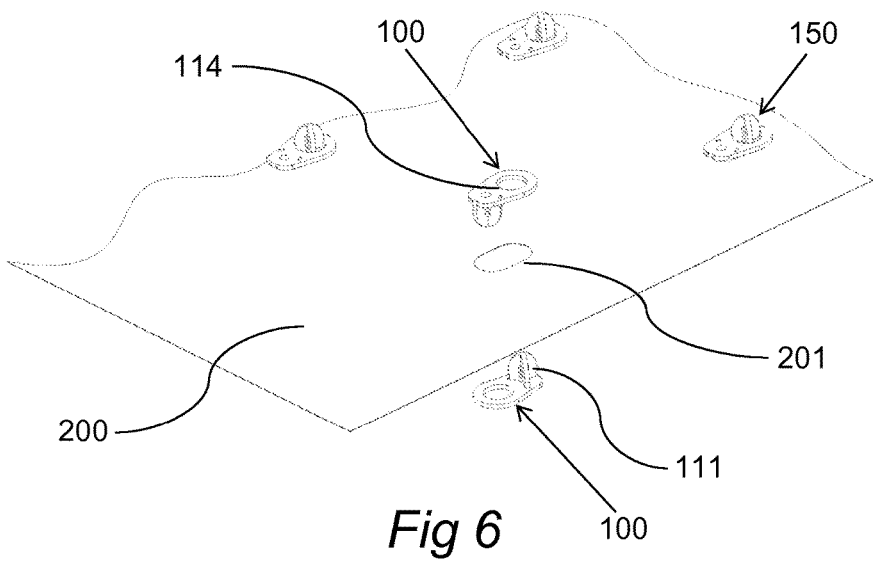
FIG. 6. Illustrates opposing TOD spacers in accordance with the embodiments of the present invention that penetrate the radiant barrier surface and allow mechanical fastening therethrough.
Figure 7:
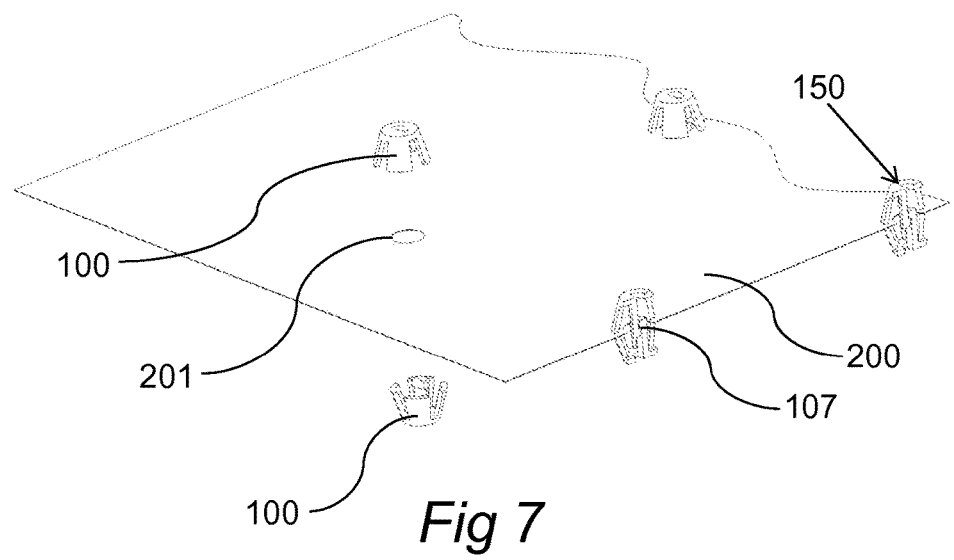
FIG. 7. Illustrates yet another embodiment of the present invention that allows mechanical fastening through the radiant barrier layer with a snapping feature.
Figure 8:
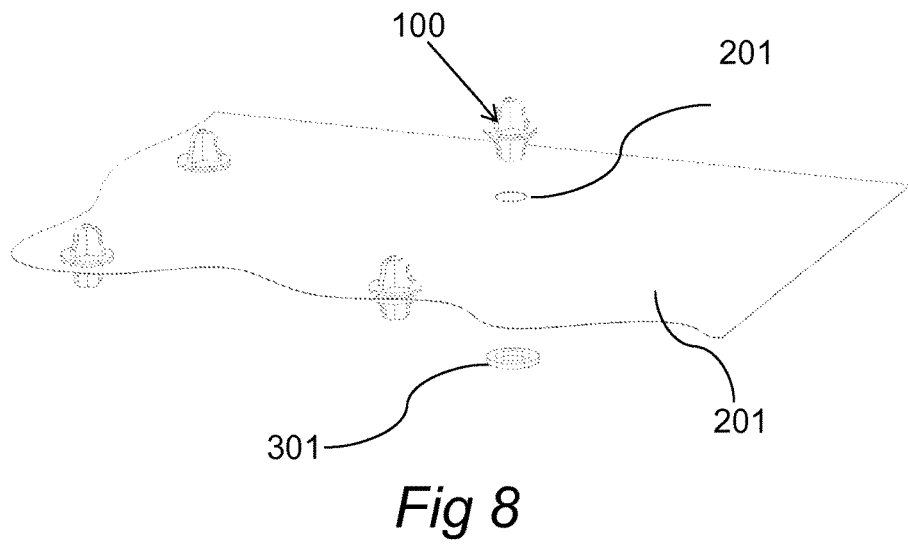
FIG. 8. Illustrates another embodiment in accordance with the present invention that allows mechanical fastening through the radiant barrier layer. Support features are provided on both sides of the radiant barrier.

An alternative embodiment of the spacer could be identical opposing spacers 100 as shown in FIG. 6. A spacer 100 would be positioned on either side of the radiant barrier 200 and snapped through a suitable hole or slot 201. The opposing spacers 100 would have suitable features such as a press fit bulb 111 into a hole 114 required to hold each captive to the other. This would result in a spacer system 150 protruding from both sides of the radiant barrier, though the spacers are not perfectly aligned, but offset by a small distance. FIG. 7 also depicts opposing spacers 150 wherein the restraint of opposing spacer 100 could be accomplished through use of a snap arm 107 trapping the radiant barrier 200 between both spacers of the system 150. This would produce spacers that are aligned across the radiant barrier. A single spacer 100 could protrude through hole 201 in radiant barrier 200 as shown in FIG. 8 and be secured by use of an additional fastener 301. Each of the embodiments depicted in FIGS. 6-8 produce a bulbous shape or spacer on both sides of the radiant barrier 200. The reason for this will become apparent in following figures. Having a spacer shape on both sides of the radiant barrier would require spacers 100 only on alternating layers and not each individual layer thus reducing part count and part handling.

Figure 9:
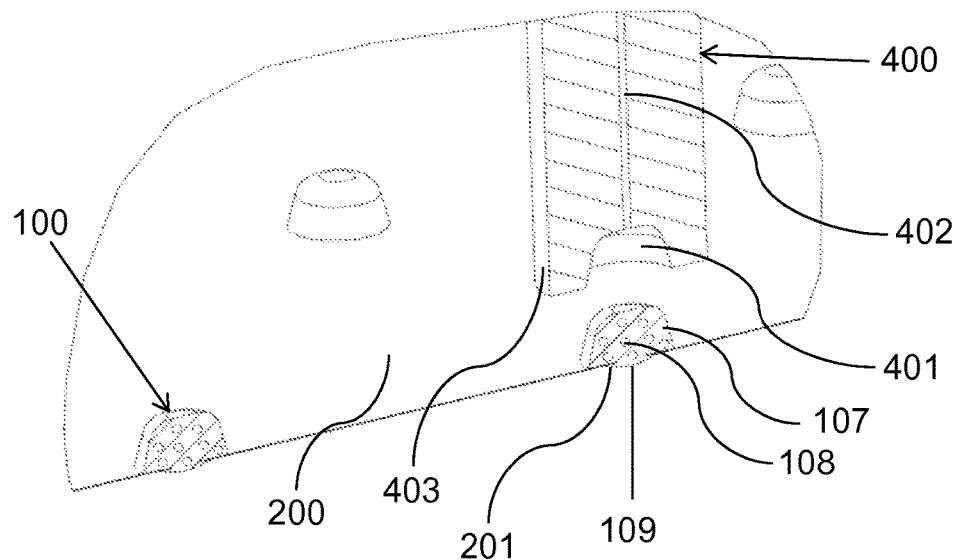
FIG. 9. Illustrates in cross section another embodiment of the present invention wherein the spacer is cured flowable mixture of low thermally conductive materials. The desired geometry is produced through use of a dispensing form. The flowable mixture could be passed through the radiant barrier and allowed to produce a bulbous feature on the opposite side thus creating a mechanical attachment.

The spacer 100 could be produced in-situ from a flowable, curable mixture as illustrated in FIG. 9. The mixture of the flowable material could be a UV or heat curable adhesive or resin 107 combined with a very low thermally conductive filler material such as glass microspheres or fibers 108. The resultant mixture has an effective thermal conductivity much lower than the base carrier material 107. The structural shape of the spacers 100 are controlled by a forming fixture 400 wherein the cavity 401 resembles a negative of the predefined spacer shape. The forming fixture is placed against the surface of the radiant barrier 200, and the flowable mixture 107/108 is dispensed onto the surface through channel 402 into cavity 401 filling the void to radiant barrier 200. If additional mechanical attachment strength is desired, the flowable material could pass through a hole 201 in radiant barrier 200 creating a bulbous shape 109 on the opposite side. Once the void 401 is completely filled with the flowable mixture, the body of the forming fixture 400 is exposed to the curing agent such as heat or UV light. If the base material of the flowable mixture is UV curable, the surface 403 of the fixture body 400 would need to be UV transmissive material. This allows UV energy to pass through the body 400 and cure the spacer 100. The UV energy is sufficient to cure the mixture solid completely through including the bulbous shape 109 on the opposite side thus creating a mechanical attachment.

Figure 10:
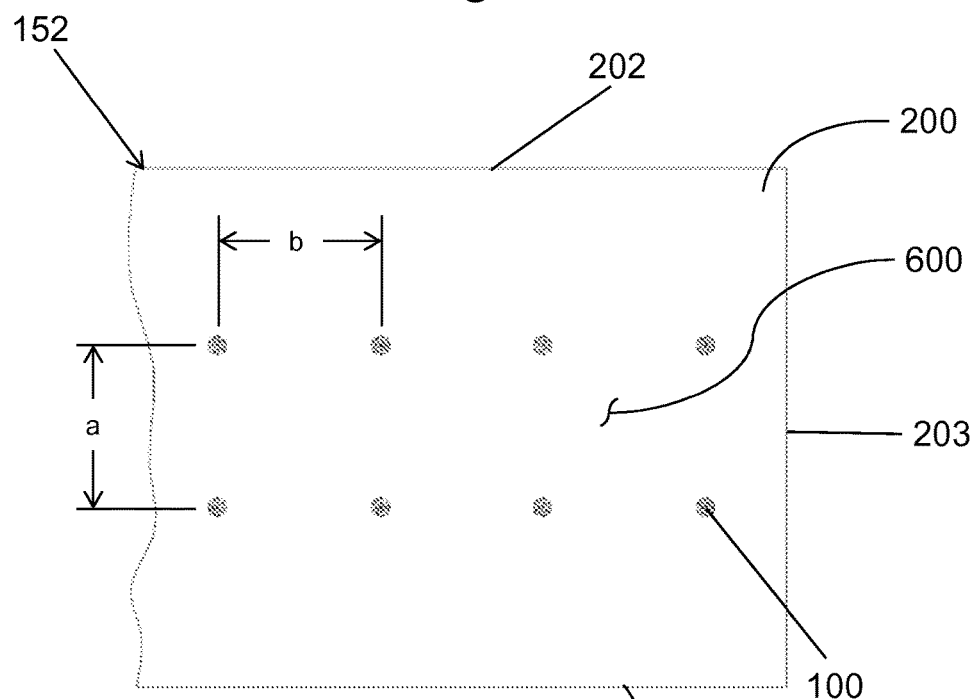
FIG. 10. Illustrates the spacer of the present invention positioned in an inline layout on a radiant barrier strip in order to optimize for wrapping requirements.
Figure 11:
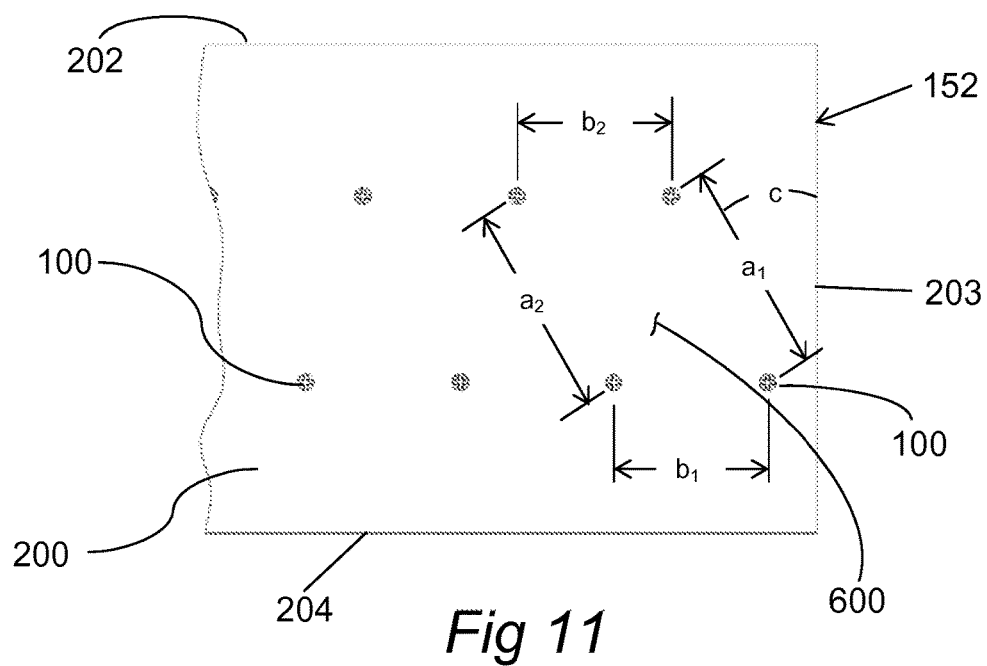
FIG. 11. Illustrates spacer of the present invention positioned in an offset layout on a radiant barrier strip in order to optimize for wrapping requirements.

The primary function of the spacer is to separate radiant barriers in a multilayer insulation. The combination of the spacers 100 and the radiant barrier 200 is depicted as a panel assembly 152 as shown in FIG. 10. The spacers 100 are positioned on the radiant barrier 200 in order to support an adjacent layer that will become apparent in following figures. The spacers 100 in this illustration are positioned in a square or rectangular array with predefined spacing a and b on radiant barrier 200 as shown and attached through one of the methods described earlier. The arrangement of adjacent spacers produces a span area denoted by 600 in FIG. 10. One embodiment of the invention would have a number of rows (2 shown here as a representative sample and should not be limiting) of spacers located substantially parallel to edge 202 and 204 and columns substantially parallel to edge 203. Distance a and b are optimized for a desired wrap diameter to minimize the effective thermal conductivity of the panel 152. Alternatively, the grid spacing of spacers can be skewed to promote more efficient methods of layer support as depicted in FIG. 11. In this illustration, the multiple rows remain substantially parallel to edges 202 and 204 at spacing denoted by b1 and b2, whereas the columns are no longer parallel to edge 203, rather skewed by some angle c at spacings a1 and a2 that may be equal. Once again the adjacent spacers 100 create a lateral spacing denoted by 600 that is suitable to support adjacent layers in a multilayer insulation. The skewing of the spacer grid can be advantageous when helically wrapping a pipe with a predefined wrap pitch.

Figure 12:
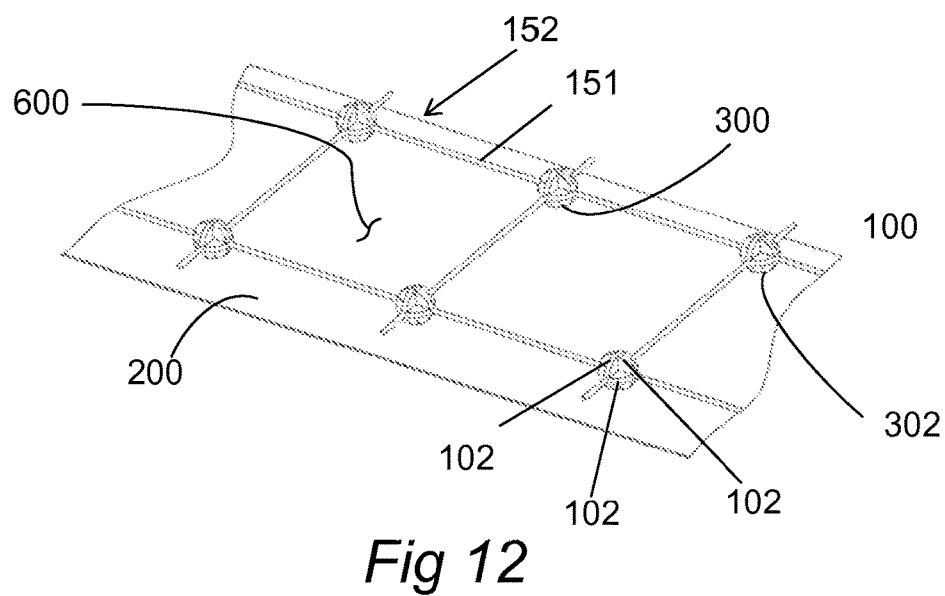
FIG. 12. Illustrates spacers of the present invention positioned on a mesh matrix in order to predefine the orientation and spacing of said spacers for optimization of system performance.

The spacer grid array could be defined by an alternative means as depicted in FIG. 12. The grid spacing 600 could be constrained by an additional lattice support 151 wherein the lattice not only locates the spacer 100, but orients the spacers in a preferred orientation on edge as described in FIG. 3. The lattice could be metal, polymer, or fiber thread. The spacers could be threaded onto the lattice or possibly injection molded directly onto the lattice material. The lattice structure can then be attached to the radiant barrier 200 by adhesive 300 or some other method producing a panelized system 152 for wrapping pipe and supporting adjacent panels.

Figure 13:
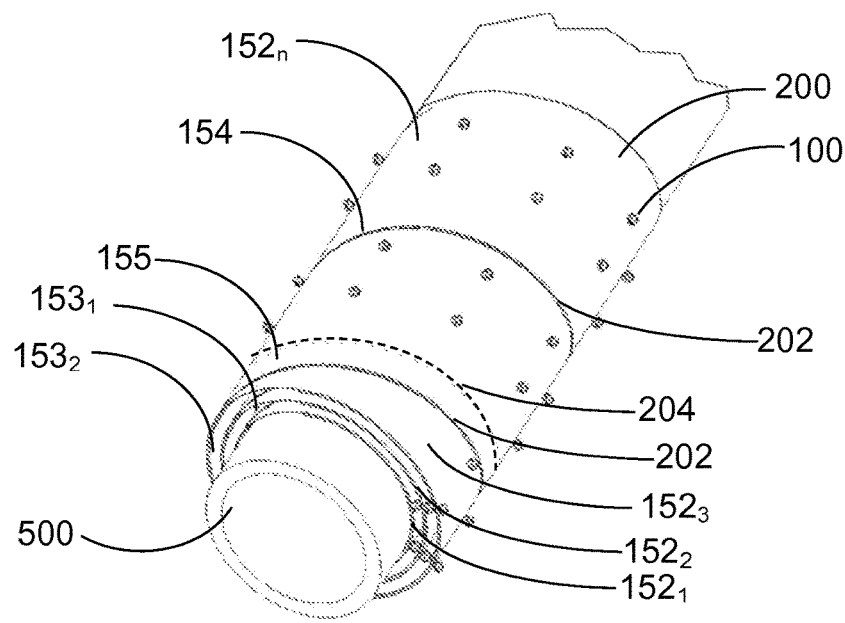
FIG. 13. Illustrates a helical wrapping method of radiant barrier/spacer strips wherein adjacent layers are supported by the previous wrap of spacers of the present invention.

As illustrated in FIG. 13, the insulation panel assemblies 152 are wrapped in a layered fashion about a hot or cold feedline 500. A helical wrapping method is illustrated in FIG. 13 where the panel 152 traverses the length of the pipe by a wrap pitch 154. The panel width and wrap pitch are defined to provide a slight overlap 155 of subsequent wraps. Leading edge 202 overlaps trailing edge 204 by some amount to prevent open gaps in the layer. Panels are wrapped in succession about the pipe and then about an adjacent layer. The first layer $152_1$ is wrapped about the pipe. The second layer $152_2$ is wrapped about the 1st layer and supported on the exposed spacers 100 adhered to the radiant barrier surface 200. With the layer being supported on the spacers, a gap between radiant barriers is created 153₁. Layering of panels continues to the desired number of layers 152ₙ creating predefined spaces between adjacent layer 153ₙ₋₁. Once completed, layers 152₂ through 152ₙ are supported only on the previous layer spacers and all thermal conduction from layer to layer must transmit through the spacers.

Figure 14:
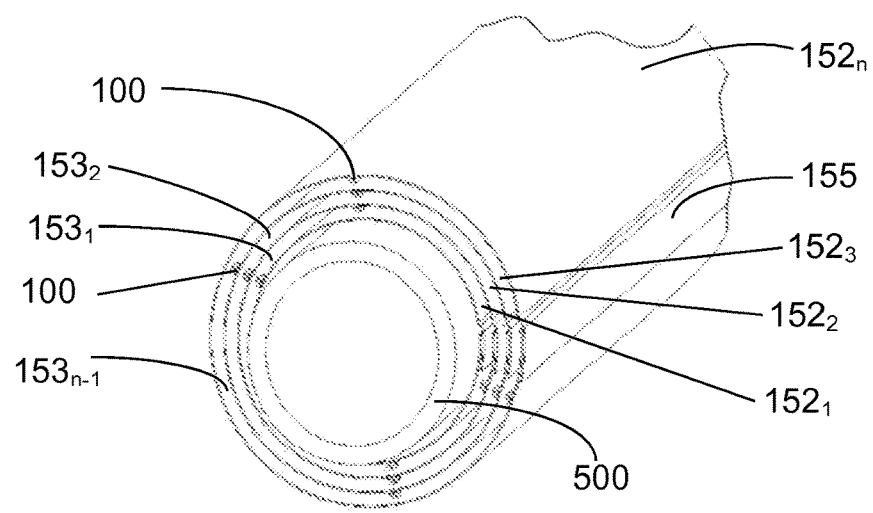
FIG. 14. Illustrates a clamshell wrapping method of radiant barrier/spacer strips wherein adjacent layers are supported by the previous wrap of spacers of the present invention.

Alternatively, the insulation could be wrapped in a clamshell method as depicted in FIG. 14. The panels 152 would be defined to minimize the number of spacers 100 required to support an adjacent layer. Panel 152₁ would be wrapped about the circumference of the pipe 500 covering some predefined length allowing a small overlap 155 of material to prevent open gaps for radiative losses. Subsequent panel 152₂ is then wrapped about the circumference and supported on the spacers of the previous layer creating a gap 153₁ between layers. The layering continues until the desired number of layers is reached 152ₙ and subsequent gaps 153ₙ₋₁ are created. The spacers shown in FIGS. 13-14 are represented as being aligned and are for illustration only. The spacers could be unintentionally or intentionally mis-aligned per application requirements. Any heat transfer from or to the feedline is controlled through the insulation system. The radiative losses are minimized by the number and emissivity of the radiant barriers 200, and the conductive losses are minimized by limiting the thermal conduction through the spacers 100.

Figure 15:
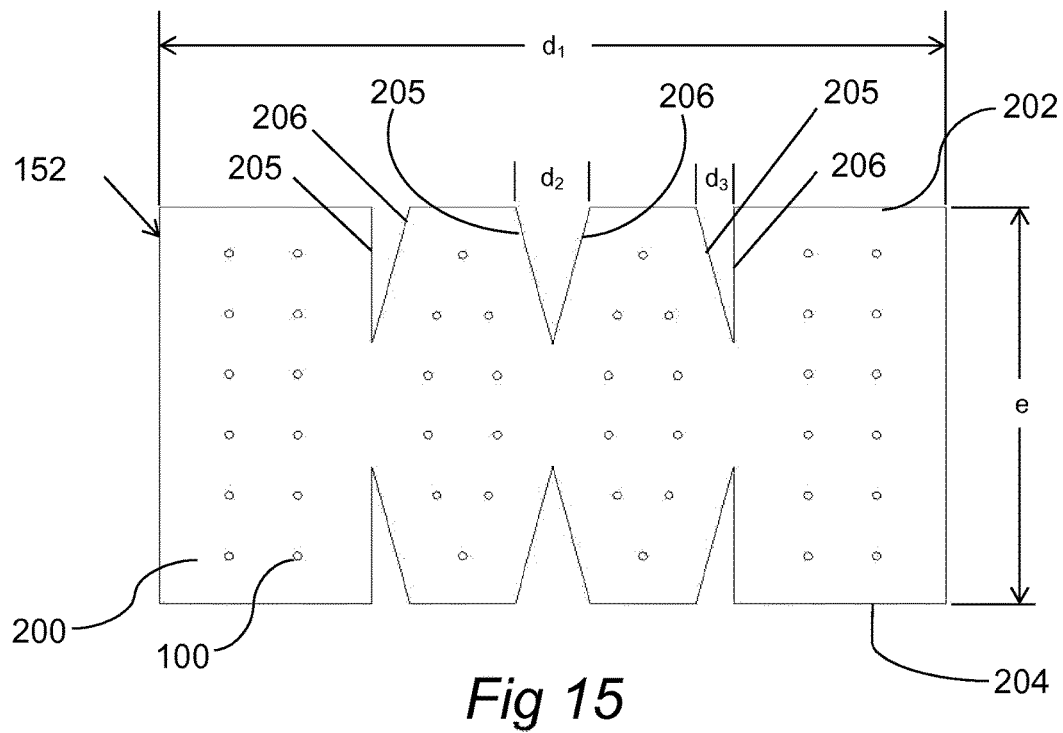
FIG. 15. Illustrates a panel with spacers intended to wrap a complex 3-dimensional geometry such as a 90 degree corner.
Figure 16:
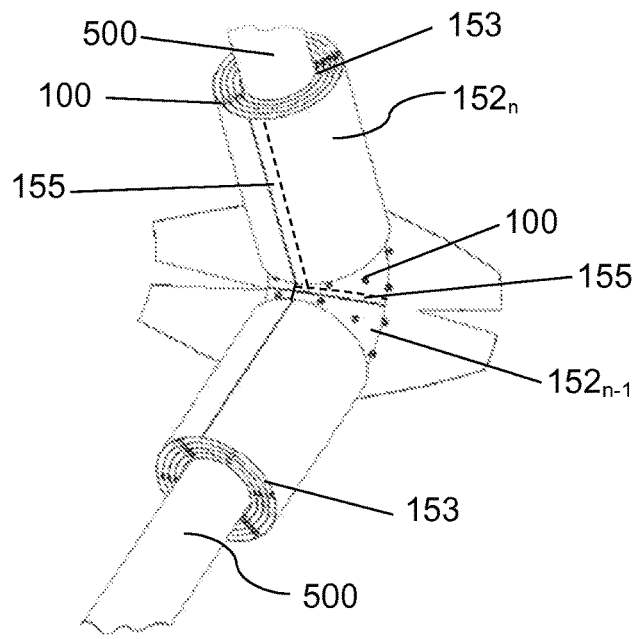
FIG. 16. Illustrates a clamshell wrapping method of radiant barrier/spacer panels for wrapping corner or junctions wherein adjacent layers are supported by the previous wrap of spacers of the present invention.

The spacer radiant barrier panels 152 can also be applied to more complex geometry such as elbows, junctions, tees and valves in piping systems. In the case of an elbow as shown in FIG. 16, a panel can be defined as shown in FIG. 15. The overall panel size is defined to wrap both the spine length d1 of a corner and the circumference e. Cutouts d2 and d3 are defined to allow the wrapping along the changing spine length in a compound geometry with minimal material buckling. The cutouts are defined such that when the panel is wrapped about the junction, there is a slight overlap of edge 205 with 206 to prevent gaps within layers. The panel is sized appropriately to allow a slight overlap from edge 202 with 204. Spacers 100 are distributed in a predefined arrangement onto radiant barrier 200 as illustrated in FIG. 15 adequate to support the adjacent layer and all other layers. The overall size of the panel, the size of the cutouts, and the spacer locations are determined for each individual layer and dictated by the geometry being wrapped. The insulation assembly is depicted in FIG. 16 and is comprised of a series of layered panels 152 as described in FIG. 15. Layer 152₁ is wrapped about the pipe 500 and then each successive layer 152₂, 152₃ to 152ₙ₋₁ is wrapped about the previous layer and supported on the spacers creating a gap 153 between adjacent layers. Generally layer 152ₙ would not have spacers, rather would be the outermost radiant barrier. Each seam provides a small overlaps 155 as described for FIG. 15 preventing radiative losses through gaps.

Figure 17:
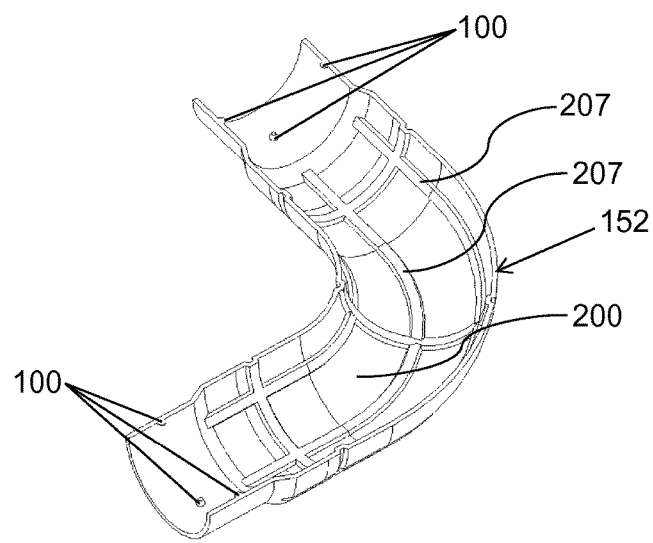
FIG. 17. Illustrates another embodiment of the present invention wherein the spacer feature(s) include a radiant barrier feature for handling corners, junctions and other complex components.
Figure 18:
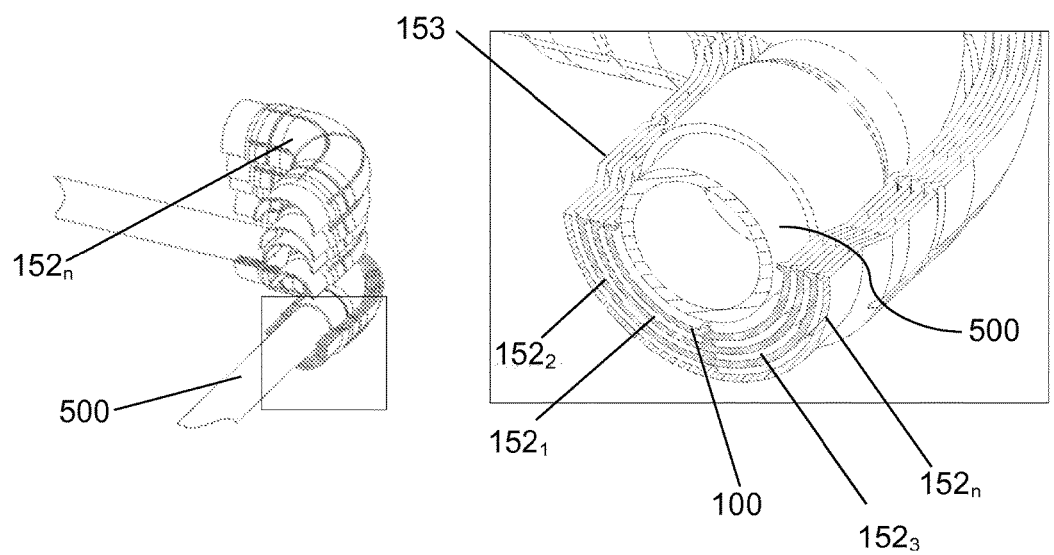
FIG. 18. Illustrates a nesting of spacer/radiant barrier embodiments creating a multilayer thermal barrier to minimize system heat flux.

An alternative embodiment of the present invention is illustrated in FIG. 17 and FIG. 18, wherein the radiant barrier 200 is an integral feature of the spacers 100. The spacers 100, retain the same general function of reduced thermal conduction from layer to layer, but the structure of the panel 152 consisting of the spacers 100 and radiant barrier 200 are of the same material and manufacturing process. The structure 152 could be produced through injection molding, rapid prototyping, or stereolithography processes. Strengthening ribs or features 207 could be implemented to add rigidity to the structure. A series of layers are constructed to nest together as shown in FIG. 18. The innermost layer 152₁ would be in direct contact with the hot or cold feedline 500, but would only contact at the spacer locations 100. Subsequent layer 152₂, 152₃, 152ₙ would be placed overtop the previous structure, but only touch on the spacer locations 100. With the nesting of structures 152, a gap 153 is created between adjacent layers, and the thermal conduction between layers can only travel through the spacer features and therefore is greatly reduced. The surfaces of each of the panels 152 could be selectively plated with low emissivity materials such as aluminum, silver, gold or the like. The surfaces could be plated through a vapor deposition process or a leafing process to reduce radiative thermal losses. By combining the spacer and radiant barrier features in this manner, structures of higher complexity can be produced and assembly time is greatly reduced. This nesting of structures could be applied to elbows, junctions, tees, instrumentation feedthroughs, valves or other difficult to wrap (insulate) geometry. This list should be construed as illustrative, and not all inclusive.

What is claimed is:

1. A multi-layer insulation comprising:
   a first radiant barrier layer;
   a second radiant barrier layer; and
   a spacer disposed between the first radiant barrier layer and the second radiant barrier layer, wherein the spacer is attached to at least one of the first radiant barrier layer and the second radiant barrier layer, the spacer having a shape defined by an intersection of three orthogonally oriented disc shapes.

2. The multi-layer insulation of claim 1, wherein the spacer separates the first radiant barrier layer and the second radiant barrier layer, thereby defining a gap between the first radiant barrier layer and the second radiant barrier layer.

3. The multi-layer insulation of claim 2, wherein the spacer forms a thermal path between the first radiant barrier layer and the second radiant barrier layer and prevents thermal shorting of the first radiant barrier layer and the second radiant barrier layer.

4. The multi-layer insulation of claim 1 further comprising a plurality of spacers including the spacer.

5. The multi-layer insulation of claim 4, wherein spacers of the plurality of spacers are coupled together by a lattice structure comprising a plurality of coplanar lattice support members, each of the spacers disposed at an intersection of at least two of the coplanar lattice support members.

6. The multi-layer insulation of claim 1, wherein the spacer comprises at least one of an Ultem polymer, a polyether ether ketone (PEEK) polymer, and a liquid crystal polymer (LCP).

7. The multi-layer insulation of claim 1, wherein the spacer is attached to the at least one of the first radiant barrier layer and the second radiant barrier layer using at least one of bonding, welding, and ultrasonic welding.

8. The multi-layer insulation of claim 1, wherein the spacer is oriented such that the spacer contacts each of the first radiant barrier layer and the second radiant barrier layer at an intersection of two of the orthogonally oriented disc shapes.

9. The multi-layer insulation of claim 1, wherein the spacer is oriented such that the spacer contacts each of the first radiant barrier and the second radiant barrier along adjoining edges of the orthogonally oriented disc shapes.

10. The multi-layer insulation of claim 1, wherein at least one of the first radiant barrier layer and the second radiant barrier layer comprises a flexible material.

11. An insulation layer for use in a multi-layer insulation, the insulation layer comprising:
- a radiant barrier layer having a first side and a second side opposite the first side; and
- a plurality of first spacers, each first spacer having a shape defined by intersecting arcuate members extending from a base, wherein the first spacers are mechanically coupled to the radiant barrier layer such that the arcuate members of the first spacers extend from the first side;
- wherein each first spacer of the plurality of first spacers comprises a coupling feature for mechanically coupling the first spacer to the radiant barrier layer, the coupling feature extending from the base and extending through the radiant barrier layer.

12. The insulation layer of claim 11, wherein each of the first spacers is mechanically coupled to the radiant barrier layer by one of (i) a fastener disposed on the second side of the radiant barrier layer and attached to the coupling feature, and (ii) by melting the coupling feature into a rivet disposed on the second side of the radiant barrier layer.

13. The insulation layer of claim 11, wherein the intersecting arcuate members are a pair of orthogonally intersecting semi-circular discs.

14. The insulation layer of claim 11, further comprising a plurality of second spacers, each of the second spacers having a shape defined by intersecting arcuate members, wherein each of the second spacers are mechanically coupled to a respective one of the first spacers such that the arcuate members of the second spacers extend from the second side.

15. The insulation layer of claim 11, wherein the first spacers are distributed across the radiant barrier layer in at least one of a rectangular array and a non-rectangular array in which the first spacers are distributed across the radiant barrier layer in a plurality of rows and at least a portion of the rows are offset relative to each other.

16. A multi-layer insulation comprising:
- a first radiant barrier layer;
- a second radiant barrier layer; and
- a plurality of spacers formed, at least in part, from a plurality of orthogonally intersecting discs and configured to maintain a predetermined spacing between the first radiant barrier layer and the second radiant barrier layer, each of the plurality of spacers defining a thermally conductive path extending through the spacer from a first area in contact with the first radiant barrier layer to a second area in contact with the second radiant barrier layer, wherein:
  - each thermally conductive path has a cross-sectional area (A), a length (L), and an effective length defined as a ratio of the cross-sectional area to the length (A/L), and
  - each of the plurality of spacers is shaped to minimize the effective length.

17. The multi-layer insulation of claim 16, wherein the plurality of spacers is at least one of disposed between the first radiant barrier layer and the second radiant barrier layer and mechanically coupled to at least one of the first radiant barrier layer and the second radiant barrier layer.

18. The multi-layer insulation of claim 16, wherein:
- each spacer defines one or more voids such that the first area is adjacent a first void and the second area is adjacent a second void, and
- the first void and the second void are one of a continuous void and discontinuous voids.

19. A spacer for maintaining a predetermined spacing between adjacent layers of a multi-layer insulation, the spacer having a shape defined by an intersection of three orthogonally oriented disc shapes.

* * * * *